United States Patent Office 3,784,531
Patented Jan. 8, 1974

3,784,531
PROCESSING OF RUBBER
Stanley D. Zimmerman, Morrisville, Pa., and Paul O. McCoy, Hightstown, N.J., assignors to Cities Service Company, New York, N.Y.
No Drawing. Filed Dec. 23, 1971, Ser. No. 211,639
Int. Cl. C08d *3/04, 5/04;* C08f *15/40*
U.S. Cl. 260—85.3 H
13 Claims

ABSTRACT OF THE DISCLOSURE

A halogen is incorporated into a solution of rubber dissolved in an organic solvent to effect halogenation of the rubber. Anhydrous ammonia is then dissolved in the rubber solution and reacts with any free halogen, hydrogen halide, or hypohalide present in the solution after halogenation of the rubber. The ammonium halide reaction product is filtered or washed from the halogenated rubber solution and the organic solvent is vaporized and removed from the halogenated rubber. This invention can be employed to advantage in the neutralization of brominated or chlorinated butyl rubber.

BACKGROUND OF THE INVENTION

The present invention pertains to the halogenation of rubber. More particularly this invention pertains to neutralization of any free halogen, hydrogen halide, or hypohalide which remain in solution after halogenation of a rubber while it is dissolved in an organic solvent.

It is known that the physical properties of a rubber can be advantageously altered by halogenation. For instance, bromine, chlorine or mixtures thereof can be fed into a solution of rubber dissolved in an organic solvent, and the extent to which the rubber properties are thus altered is subject to variation, depending among other things upon the type and amount of halogen introduced into the rubber and the nature of the halogenating reaction. Halogenation of the rubber can occur at least partially through an addition reaction but more frequently is predominately via substitution whereby hydrogen in the rubber molecule is replaced by halogen, and the hydrogen ion thus replaced reacts with part of the halogen to produce hydrogen halide which is soluble in the rubber solution. This hydrogen halide, along with any free halogen or hypohalide must be removed from the solution in order to provide a high quality halogenated rubber product which is stable to heat. Residual acidic materials also detrimentally affect the scorch resistance and vulcanization characteristics of the rubber.

Prior process for neutralizing acidic materials in halogenated rubber solutions involve washing of the solution with water and/or contact with an aqueous solution of a base to accomplish the neutralization. See, for instance, U.S. Pats. 2,973,346, 3,099,644, 3,242,148. It is thus notoriously difficult to extract dissolved halogen or hydrogen halides from a rubber solution by contact with water. Extensive, intensive and repeated disruption and subdivision of the immiscible organic and aqueous phases is required in order to establish and maintain the necessarily intimate contact for satisfactory transfer of halogen and hydrogen halides from the organic to the aqueous phase, and this is further complicated by the fact that the partition coefficient for hydrogen halides is largely in favor of the organic phase rather than the aqueous phase.

It is therefore an object of this invention to provide an improved method for neutralizing and removing undesired free halogen or halogen compounds from rubber following halogenation.

It is another object of this invention to effect in situ neutralization of undesired halogen or halogen compounds, dissolved in a rubber solution by reaction with anhydrous ammonia.

Still another object of the present invention is to neutralize halogen or halogen compounds dissolved in a rubber solution by reaction with anhydrous ammonia and thus produce an ammonium halide which can be removed from the solution by washing with water or by filtration.

Even other objects and advantages of the present invention will become apparent from the following description, specific examples, and the appended claims.

SUMMARY OF THE INVENTION

The present invention is an improved method for neutralizing halogenated rubber which is produced by introducing a halogen into a solution of the rubber dissolved in an organic solvent, the reaction between the rubber and halogen being controlled to effect the type and degree of halogenation desired. In accordance with the present invention, anhydrous ammonia is dissolved in the rubber solution after the halogenating reaction has been completed, thus forming ammonium halide by reaction with undesirable residual materials such as hydrogen halides, free halogen, hypohalides, and the like. The ammonium halide is insoluble in the rubber solution and the resulting precipitate can be removed by filtration. On the other hand the ammonium halide is soluble in water and can thus be washed from the solution by slurrying the solution with water. Where preferred, the undesirable halogen residue can be partially neutralized by means of a redox agent other than ammonia, e.g., sodium thiosulfate, sodium iodide or potassium iodide.

While it will be apparent that the invention can be employed for neutralizing any undesirable halogen or reactive halogen compound contained in the rubber solution, it has been found particularly useful in the production of brominated or chlorinated butyl rubber while employing any appropriate normally-liquid hydrocarbon or a halogenated derivative thereof as the solvent for the rubber. Exemplary processes for the preparation of brominated and chlorinated butyl rubber are disclosed, for instance, in U.S. Pats. 2,631,984, 2,732,354, 2,944,578, 2,964,489.

DETAILED DESCRIPTION OF THE INVENTION

The term "rubber" as used herein is intended to mean any elastomer which contains at least some olefinic unsaturation and can be vulcanized.

The present invention can be used to particular advantage for neutralizing halogenated rubbers produced by reacting bromine or chlorine with copolymers of a major portion of an isoolefinic hydrocarbon containing 4 to 8 carbon atoms and a terminal methylene group connected by a double bond to another carbon atom, and a minor portion of a polyolefinic hydrocarbon containing 4 to 14 carbon atoms selected from the group consisting of acyclic diolefins, acrylic triolefins and alicyclic triolefins. Rubbers comprising from about 70 to 99% polyisobutylene and about 1 to 30% isoprene (more commonly about 2–10% isoprene) are generally known as IIR or "butyl" rubber, halogenated varieties of which are employed, for example, in the manufacture of pneumatic tire inner-liners, hoses, belts, mats, extruded goods and O-rings. Halogenated butyl rubbers usually contain from about 2–3 weight percent of bromine or from about 1.0 to 1.5 weight percent of chlorine, retain substantially all of the olefinic unsaturation of the butyl, and are vulcanizable through the halogen and also through the double bonds of the polymer.

As was previously indicated, the nature and degree of polymer halogenation is subject to considerable variation and can be conducted in accordance with methods described in the prior art whereby rubber is dissolved in a solvent and a halogen is dissolved in the resulting solution for reaction with the rubber under controlled conditions. Using chlorine or bromine, either the liquid or gaseous form of these halogens can be dissolved in the rubber solution for reaction with the polymer.

Reaction of the halogen with the rubber can be almost entirely by addition, almost entirely by substitution of hydrogen, or a combination of the two reactions in almost any proportion so that undesirable residual halogen left in the rubber solution is predominately in the form of free halogen which has not combined with the rubber, hydrogen halide produced by reaction of part of the halogen with hydrogen ion liberated from the rubber, other halides, hypohalides, or mixtures thereof.

Suitable solvents for dissolving the rubber and effecting the halogenation wherein the halogenating reaction can be effected include liquid hydrocarbons and halogenated derivatives thereof such as pentane, hexane, heptane, toluene, cyclohexane, chlorobenzene, carbon tetrachloride, trichloroethane, and the like. The amount of rubber which can be dissolved in the solvent is subject to variation and will usually be within the range of about 5 to about 50 weight percent, although other concentrations are permissable when such are practical. The primary factor which must be considered is the viscosity of the solution, i.e. it should not be so thick as to seriously hamper dispersion and solution of a halogenating agent therein or subsequent neutralization and recovery of the halogenated rubber. Since it is also generally desirable to recover and reuse the solvent, it should not be excessively reactive with the halogen and should be readily vaporizable at a temperature below that at which the halogenated polymer is thermally degraded.

As previously indicated neutralization of free halogen or reactive halogen compounds in the solution of halogenated rubber is particularly accomplished with anhydrous ammonia as opposed to aqueous ammonia. As a consequence, the rubber solution should be either almost entirely free or at least practically free of water when the anhydrous ammonia is dissolved in the solution, for otherwise the ammonia will preferentially dissolve in the water and problems incumbent in neutralizing undesirable halogen or halogen compounds in the rubber solution by means of an immiscible aqueous solution of a base will not be avoided. The object is to accomplish reaction between ammonia and the halogen and/or halogen compound while each is dissolved in the solvent along with the rubber, thereby produce ammonium halide which is insoluble in the rubber solution, and thereafter remove the ammonium halide precipitate from the solution by filtration or by washing with water. Ammonium halide is more easily removed from the halogenated rubber solution by water washing than is the considerably covalent hydrogen halide since the ammonium compound is ionic and has a higher partition coefficient in favor of water.

In most instances halogenation of rubber while dissolved in an organic solvent can be carried out at room temperatures, i.e. about 0° C. to about 30° C. The solubility of ammonia in the resulting solution is high enough at such temperatures to permit effective neutralization of halogen and hydrogen halide dissolved therein by reaction in situ, i.e. reaction within the solution between dissolved reactants. Higher and lower temperatures can also be employed, including those at which the ammonia and/or the materials to be neutralized are in a liquid state, but it will be appreciated that room temperatures are more attractive for halogenation and neutralization of the rubber since these operations are made easier and more economical when there is no need for refrigeration or heating. The amount of ammonia dissolved in the solution should be sufficient to at least substantially neutralize the solution and a slight excess of ammonia can be employed to assure complete neutralization of halogen and/or hydrogen halide.

Ammonium halide produced by reaction of the dissolved ammonia with halogen and/or reactive halide compound forms as a precipitate in the rubber solution and can be separated therefrom by settling, centrifugation, filtration or combinations of these techniques for recovery of a purified rubber solution.

In an alternative method of removing the ammonium halide from the rubber solution, the solution is mixed with water and the mixture is vigorously agitated until the water soluble ammonium halide is transferred to the aqueous phase. Preferably, water washing of the solution is carried out prior to vaporization and removal of solvent from the halogenated rubber. Washing can be conducted in one or more steps, i.e. the solution can be washed and the water containing the dissolved ammonium halide can be separated and removed from the immiscible rubber solution, followed by mixing of the solution again with still more water for further removal of the ammonium halide, and repeating the washing steps until removal of the salt is practically complete. By means of several washing steps employing vigorous agitation, removal of the ammonium halide from the rubber solution can be quickly accomplished. Where longer contact times can be afforded the solution can be washed in one step under reduced agitation. Using hot water it is possible to wash the ammonium chloride from the rubber solution and vaporize the solvent therefrom in one step, but it is generally more convenient and practical to effect these procedures in separate steps. The water which contains the ammonium halide can be treated for removal and recovery of the salt after separation from the rubber.

Vaporization of the organic solvent from the halogenated rubber can be accomplished either in the presence or substantial absence of water. For instance, the rubber solution and wash water can be allowed to separate, followed by decantation of the water and heating of the solution to drive off the solvent. However, it is not necessary that water be removed from rubber solution prior to solvent vaporization, i.e. a mixture of rubber solution and water, which can be at least part of the wash water, can be heated to drive off the organic solvent to effect coagulation of the rubber in the form of crumbs which become suspended in the water. Subsequently the crumb rubber can be separated from the water and released solvent can be condensed and recovered for reuse. Heating of the mixture of rubber solution and water to vaporize the solvent can be accomplished by use of hot water informing the mixture and/or by addition of steam.

The invention will be further described with reference to chlorobutyl rubber, and the following description is intended to be illustrative without limiting the scope of the invention, since other rubbers, halogens, proportions, conditions, etc., can also be employed.

Butyl rubber is dissolved in a solvent such as hexane or carbon tetrachloride at a concentration of about 10–30 weight percent of rubber. At room temperature, i.e. about 5–35° C., chlorine is added to the rubber solution in an amount within the range of about 1–3 weight percent of the rubber, the actual amount being dependent upon the degree of chlorination required, usually within the range of about 0.5–1.5 weight percent based upon the weight of the rubber. Initial reaction between the rubber and the chlorine is very rapid, being largely completed within a matter of seconds, and practically completed within 30–60 minutes. Reaction of the chlorine with the rubber appears to be almost entirely via substitution, and the hydrogen ions thereby released from the rubber molecules react with some of the chlorine to form hydrogen chloride. A slight excess of chlorine can also be present to assure proper levels of substitution. After the reaction is completed, unreacted chorine or hypochlorites must be removed to avoid molecular weight lowering of the chlorobutyl rubber. (Hypochlorites can form by reaction of some of the chlorine with any alkali metal salt residue in the rubber.) As previously indicated, hydrogen chloride must be removed from the halogenated rubber to assure thermal stability and scorch resistance of the product.

After the chlorination reaction is completed, anhydrous ammonia is then dissolved in the halogenated butyl rubber solution in an amount which is slightly in excess of that required to react with all of the free chlorine, hydrogen chloride, hypochlorite and other acidic halogen materials in the solution. Use of a slight excess of ammonia insures practically complete conversion of free chlorine and hydrogen chloride dissolved in the rubber solution to ammonium chloride. The reactions involved are as shown:

(1) $8NH_3 + 3Cl_2 \rightarrow 6NH_4Cl\downarrow + N_2\uparrow$
(2) $NH_3 + HCl \rightarrow NH_4Cl\downarrow$
(3) $2NH_3 + 3OCl^- \rightarrow 3Cl^- + N_2\uparrow + 3H_2O$ It will be reemphasized that the rubber solution should be substantially free of water upon dissolving the anhydrous ammonia therein lest ammonium hydroxide be formed which is immiscible with the rubber solution, thereby physically hindering reaction of ammonia with halogen or reactive halogen compounds.

The ammonium chloride forms as a precipitate and can be at least partially removed from the rubber solution by settling and/or filtration. As an alternate to, or in conjunction with filtration, the neutralized chlorinated butyl rubber solution can be mixed with water for removal of the ammonium chloride. For example, the solution is mixed with an equal volume of water and agitated in the chlorination tank for several minutes. Subsequently, the immiscible aqueous and the organic phases are allowed to separate and the salt-containing water is then drained off, thus disposing of the bulk of the ammonium chloride. The rubber solution is then washed again for as many times as is necessary to provide a solution that is practically free of the salt.

After the ammonium chloride has been substantially removed, the chlorinated butyl rubber solution is then mixed with hot water at a temperature sufficient to effect vaporization and release of the organic solvent from the rubber. The rubber coagulates as a crumb which becomes suspended in the water. Solvent vapors are collected, condensed and reused for dissolving more butyl rubber which is to be chlorinated. The wet crumb rubber is first drained of water and is then passed to an extrusion drying process wherein practically all of the remaining water is removed from the rubber. After drying, the rubber is baled for storage and shipment.

Example I

Eleven pounds of Bucar 5000 NS (butyl rubber) were dissolved in 30 gallons of hexane to provide a rubber solution containing 5.8 weight percent of butyl rubber. To this solution at 74° F., stirred vigorously with two 8½ inch marine propellers in a 50 gallon stainless steel tank, was added 205 grams of chlorine gas from a tared bomb, through a sparger tube, in 20 minutes. After waiting 10 minutes, 55 grams of anhydrous ammonia was added from another tared bomb in 15 minutes. The resulting ammonium chloride was precipitated while the solution was stirred for 30 minutes. The solution was then washed twice with deionized water to remove the ammonium chloride. Twenty gallons of water were employed for each wash. After the second wash the organic and aqueous phases were allowed to separate and the water was then decanted off. Nine grams of butylated hydroxy toluene and 36 grams of calcium stearate was blended into the rubber solution, and the solution was then desolventized in a steam stripper. The resulting rubber crumb was then dried by one pass at 300° F. through an extrusion drier.

A high quality chlorobutyl rubber was recovered having a chlorine content of 1.03 weight percent.

During this experiment an excess of chlorine was employed since some was lost out of the open-top reaction vessel and a small percentage reacted with the hexane solvent instead of the rubber.

Example II

Two-hundred grams of Bucar 5000 NS (butyl rubber) were dissolved in 3 kilograms of carbon tetrachloride. Into this solution (34° C.) 4.3 grams of chlorine gas were introduced, the chlorine being diluted with nitrogen. Thirty minutes after addition of the chlorine the rubber solution was neutralized by introduction of about 1.4 grams of anhydrous ammonia diluted with nitrogen.

The resulting halogenated rubber solution was filtered through a pressure filter using a Celite filter aid, thus removing the ammonium chloride precipitate. The solvent was then removed from the chlorinated butyl rubber in a vacuum oven. The chlorine content of the product was 1.27 weight percent and the $NH_4^+$ content was 0.003 weight percent.

Example III

Two-hundred grams of Bucar 5000 NS were dissolved in 3 kilograms of carbon tetrachloride. With the rubber solution at 34° C., 4.4 grams of chlorine were introduced. After 15 minutes 1.0 gram of anhydrous ammonia entrained in a nitrogen stream was fed into the solution. One liter of water was then added to the solution and the mixture was stirred vigorously for 20 minutes. Most of the water was then removed from the solution by decantation. The rubber solution was then passed by way of a steam ejector into a tank of hot water, thus vaporizing the carbon tetrachloride. The carbon tetrachloride was condensed and recovered for reuse in dissolving more butyl rubber to be chlorinated. Wet rubber crumb recovered from the hot water was drained and then was dried to less than 2 percent by weight of water on a roll mill heated to 250° F. Chlorine content of the rubber product was 1.31 weight percent and $NH_4^+$ content was 0.010 weight percent, indicating almost complete removal of by-product ammonium chloride.

While the present invention has been described with reference to particular materials, proportions, conditions and the like, it will nonetheless be understood that still other embodiments will become apparent which are within the spirit and scope of the invention defined in the following claims.

Therefore, what is claimed is:

1. In a process for producing a halogenated rubber wherein a vulcanizable rubber is dissolved in an organic solvent to provide a rubber solution and a halogen is introduced into the rubber solution and reacts with the rubber, the improvement for neutralizing an undesirable residue in the solution from the group consisting of a halogen, a reactive halogen compound or mixtures thereof, consisting essentially of dissolving anhydrous ammonia in the rubber solution after halogenation of the rubber, said rubber solution being substantially free of water, reacting the dissolved ammonia with said residue, producing and separating ammonium halide from the solution, and thereafter separating the organic solvent from the halogenated rubber.

2. The process of claim 1 wherein the rubber is butyl rubber.

3. The process of claim 2 wherein the halogen is selected from chlorine and bromine.

4. The process of claim 1 wherein the ammonium halide is filtered from the polymer solution.

5. The process of claim 1 wherein the halogenated rubber solution is slurried with water, the ammonium halide in the solution becomes dissolved in the water, and the water which contains the ammonium halide is then separated from the rubber solution.

6. The process of claim 1 wherein the rubber solution is heated after removal of the ammonium halide, the organic solvent is vaporized by the heat, and the halogenated rubber is coagulated by removal of the vaporized solvent.

7. The process of claim 6 wherein the rubber solution is mixed with hot water and the organic solvent is vaporized by absorption of heat from the water.

8. The process of claim 7 wherein the halogenated rubber is coagulated in the form of crumbs which become suspended in the water, and the crumbs are separated from the water and dried.

9. The process of claim 1 wherein the reaction between the rubber and the halogen is predominately substitution, hydrogen halide is a by-product of the substitution reaction and the hydrogen halide is converted to ammonium halide by reaction with the ammonia.

10. The process of claim 1 wherein the organic solvent is a hydrocarbon.

11. The process of claim 1 wherein the organic solvent is a halogenated derivative of a hydrocarbon.

12. The process of claim 1 wherein the rubber solution is partially neutralized by means of a redox agent other than ammonia.

13. The process of claim 1 wherein the rubber is butyl rubber, the halogen is chlorine, and the halogen contained in the halogenated rubber is predominately substituted chlorine.

References Cited
UNITED STATES PATENTS

| | | | |
|---|---|---|---|
| 3,355,519 | 11/1967 | Müller et al. | 260—94.9 H |
| 2,748,105 | 5/1956 | Becker et al. | 260—85.3 H |

JOSEPH L. SCHOFER, Primary Examiner

A. HOLLER, Assistant Examiner

U.S. Cl. X.R.

260—88.2 S